US012617147B2

(12) United States Patent
Denavit et al.

(10) Patent No.: US 12,617,147 B2
(45) Date of Patent: May 5, 2026

(54) METHOD FOR THE ADDITIVE MANUFACTURE OF AN OBJECT FROM A POWDER LAYER

(71) Applicant: AddUp, Cebazat (FR)

(72) Inventors: Franck Denavit, Cebazat (FR); Etienne Blanchet, Cebazat (FR)

(73) Assignee: ADDUP, Cebazat (FR)

( * ) Notice: Subject to any disclaimer, the term of this patent is extended or adjusted under 35 U.S.C. 154(b) by 616 days.

(21) Appl. No.: 17/924,588

(22) PCT Filed: May 11, 2021

(86) PCT No.: PCT/FR2021/050807
§ 371 (c)(1),
(2) Date: Nov. 10, 2022

(87) PCT Pub. No.: WO2021/229172
PCT Pub. Date: Nov. 18, 2021

(65) Prior Publication Data
US 2023/0182379 A1     Jun. 15, 2023

(30) Foreign Application Priority Data

May 12, 2020     (FR) ...................................... 2004677

(51) Int. Cl.
B29C 64/153        (2017.01)
B22F 10/28        (2021.01)
(Continued)

(52) U.S. Cl.
CPC ............ B29C 64/153 (2017.08); B22F 10/28 (2021.01); B22F 10/366 (2021.01); *B33Y 10/00* (2014.12); *B33Y 30/00* (2014.12); *B33Y 50/02* (2014.12)

(58) Field of Classification Search
CPC ...... B29C 64/153; B22F 10/28; B22F 10/366; B22F 10/36; B22F 12/49; B33Y 10/00; B33Y 30/00; B33Y 50/02; Y02P 10/25
See application file for complete search history.

(56) References Cited

U.S. PATENT DOCUMENTS 10,337,335 B2     7/2019  Pavlov et al.
2015/0198052 A1     7/2015  Pavlov et al.
(Continued)

FOREIGN PATENT DOCUMENTS

DE            10112591 A1     10/2001
DE       102015212284 A1      1/2017
(Continued)

OTHER PUBLICATIONS

International Search Report dated Sep. 1, 2021, in corresponding PCT/FR2021/050807 (6 pages).

*Primary Examiner* — Adil A. Siddiqui
(74) *Attorney, Agent, or Firm* — VENABLE LLP

(57) ABSTRACT

A method for the additive manufacturing of an object from a powder layer comprises the steps of: projecting (200) a beam of energy onto a surface of the layer of powder in the form of a spot so as to melt the powder, scanning (202) the surface with the beam of energy so that the spot travels over the surface in a movement made up of a translation in a longitudinal direction of scanning and of a wobbling movement having at least a component in a direction of wobble, and adjusting (204) the focus of the beam of energy during the scanning according to the translation in the longitudinal direction of scanning but without taking account of the component of the wobbling movement in the direction of wobble.

10 Claims, 2 Drawing Sheets

(51) Int. Cl.

| | | |
|---|---|---|
| *B22F 10/366* | (2021.01) | |
| *B33Y 10/00* | (2015.01) | |
| *B33Y 30/00* | (2015.01) | |
| *B33Y 50/02* | (2015.01) | |

(56)                    References Cited

U.S. PATENT DOCUMENTS

| | | | |
|---|---|---|---|
| 2018/0345413 A1* | 12/2018 | Wuest .................... | B33Y 30/00 |
| 2018/0361727 A1 | 12/2018 | Tilita et al. | |
| 2019/0232427 A1 | 8/2019 | Roychowdhury et al. | |
| 2021/0178481 A1 | 6/2021 | Walrand et al. | |
| 2022/0176452 A1 | 6/2022 | De Chirico | |
| 2023/0182208 A1 | 6/2023 | Denavit et al. | |

FOREIGN PATENT DOCUMENTS

| | | | |
|---|---|---|---|
| DE | 102017219184 A1 | 5/2019 | |
| EP | 2893994 A1 | 7/2015 | |
| KR | 20200027583 A | 3/2020 | |
| WO | 2019/207239 A1 | 10/2019 | |

* cited by examiner

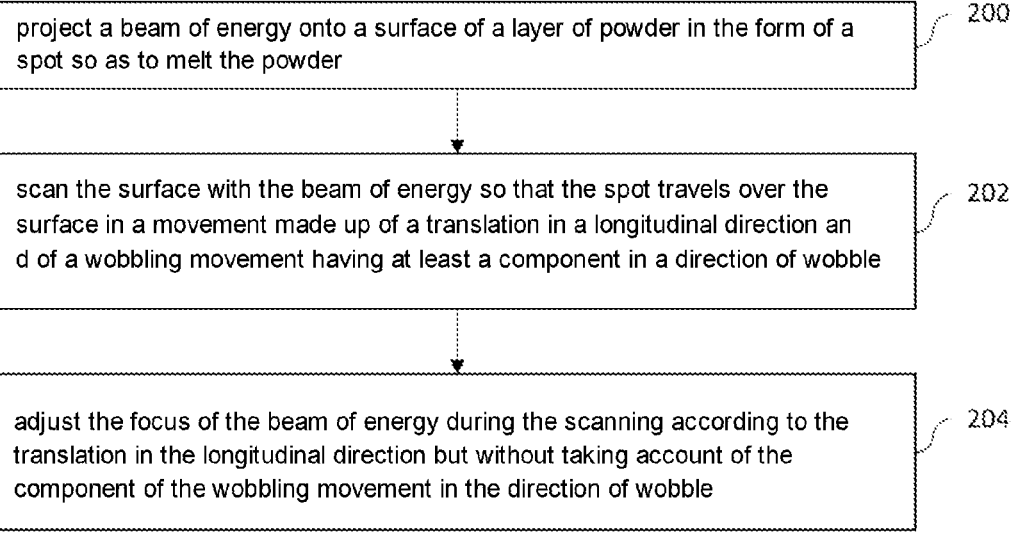

project a beam of energy onto a surface of a layer of powder in the form of a spot so as to melt the powder    200 scan the surface with the beam of energy so that the spot travels over the surface in a movement made up of a translation in a longitudinal direction an d of a wobbling movement having at least a component in a direction of wobble    202 adjust the focus of the beam of energy during the scanning according to the translation in the longitudinal direction but without taking account of the component of the wobbling movement in the direction of wobble    204

FIG. 3

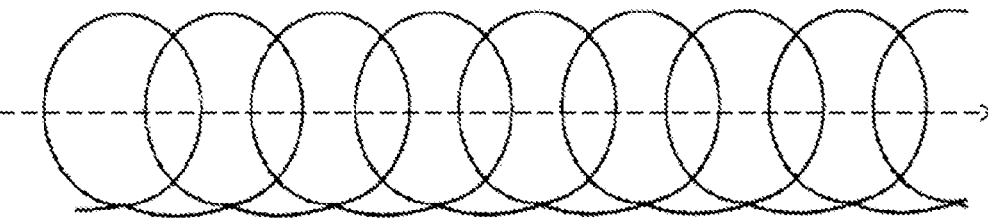

FIG. 4

METHOD FOR THE ADDITIVE MANUFACTURE OF AN OBJECT FROM A POWDER LAYER

FIELD OF THE INVENTION

The present invention relates to a method for the additive manufacturing of an object from a layer of powder, and to a device suitable for implementing such a method.

PRIOR ART

Additive manufacturing consists in producing an object by melting layers of powder that are superposed on one another. These layers correspond to various cross sections of the object that is to be manufactured.

In order to melt a layer of powder, an energy source projects a beam of energy onto the surface of this layer of powder, in the form of a spot at which such melting occurs. The beam of energy is then controlled in such a way as to scan the surface in order to spread this melting over the entire surface of the layer.

Conventionally, the beam of energy scans various zones of the surface in a longitudinal direction and in an outbound sense alternating with a return sense.

Furthermore, it has been proposed for the energy source to be controlled in such a way that the spot travels over the surface not with a translational movement that is perfectly rectilinear in the longitudinal direction but in a movement made up of a translation in the longitudinal direction and of a wobbling movement. The wobbling movement notably oscillates at a high frequency and at a low amplitude in a transverse direction so as to enlarge the melt pool. The wobbling movement is typically obtained by orienting the beam at a range of angles, in the manner of a pendulum.

It is furthermore desirable to exercise fine control over the size of the spot in order to avoid excessive fluctuations in the amount of energy applied to the layer per unit area. The size of the spot is dependent on the distance covered by the beam between the energy source and the surface, and this itself varies according to the angle of inclination of the beam with respect to the surface. The wobbling movement therefore contributes to causing the size of the spot to vary at high frequency. In order to illustrate this, FIG. 1 depicts the path of an energy beam projected onto a surface in a plane perpendicular to the longitudinal direction. In FIG. 1, the transverse direction is horizontal. The path of the beam is able to move about an axis parallel to the longitudinal direction and passing through a fixed point P. The notation used is as follows:

S is the centre of the spot in the form of which the beam is projected onto the surface.
r is the minimum distance between the points P and S.
α is the half-angle of wobble of the beam.
L is the distance between the point P and the surface S covered by the beam inclined at the angle α.
A is the half-amplitude of wobble of the point S on the surface, in the transverse direction.

During a wobble, the distance covered by the beam between the points P and the point S varies by a distance discrepancy d giving:

$$d = L - r = \sqrt{r^2 + A^2} - r$$

The value of this discrepancy d is very small. By way of example, for r=700 mm and A=0.3 mm, a value d=0.06 μm is obtained.

In order to maintain a spot size that remains perfectly constant during the course of the scanning it would then be necessary for the focusing apparatus to take account of the wobble and therefore of this very small distance discrepancy d.

SUMMARY OF THE INVENTION

One object of the invention is to be able to exercise fine control over the amount of energy per unit area applied to a layer of powder by a beam of energy during the additive manufacturing of an object, while at the same time obtaining an enlarged melt pool, but without premature wearing of the energy source that emits the beam of energy.

To this end, a first aspect of the invention proposes a method for the additive manufacturing of an object from a powder layer, the method comprising steps of:

projecting a beam of energy onto a surface of the layer of powder in the form of a spot so as to melt the powder,
scanning of the surface with the beam of energy so that the spot travels over the surface in a movement made up of a translation in a longitudinal direction of scanning and of a wobbling movement having at least a component in a direction of wobble,
adjusting the focus of the beam of energy during the scanning according to the translation in the longitudinal direction of scanning but without taking account of the component of the wobbling movement in the direction of wobble.

A focusing apparatus that adjusts the focus of the beam of energy according to the wobbling makes it possible to obtain a spot size that theoretically remains invariable over time. However, the inventors have found that a focusing apparatus configured in that way becomes worn very quickly because of the high frequency of the wobble oscillations and the low amplitude thereof.

Therefore adjusting the focus of the beam of energy during the course of scanning without taking account of the component of the wobbling movement in the direction of wobble, as in the method according to the first aspect, makes it possible to avoid such premature wear. Adjusting the focus of the beam of energy according to the translation in the longitudinal direction nevertheless does make it possible to limit significant fluctuations in spot size caused by the translational movement. Thus, the amount of energy applied per unit area using the method according to the first aspect varies in proportions that remain acceptable.

The method according to the first aspect may further comprise the following optional features, considered alone or in combination with one another where such combination is technically feasible.

As a preference, the wobbling movement comprises a transverse component in a transverse direction of scanning perpendicular to the longitudinal direction of scanning, and the focus of the beam of energy is adjusted without taking account of the transverse component of the wobbling movement.

As a preference, the transverse component of the wobbling movement oscillates at a frequency of at least 1 kHz.

As a preference, the transverse component of the wobbling movement oscillates at an amplitude of between 100 micrometres and 2 millimetres.

As a preference, the wobbling movement comprises a longitudinal component in the longitudinal direction of scanning, and the focus of the beam of energy is adjusted without taking account of the longitudinal component of the wobbling movement.

As a preference, the transverse component of the wobbling movement oscillates at a frequency of at least 1 kHz.

As a preference, the longitudinal component of the wobbling movement oscillates at an amplitude of between 100 micrometres and 2 millimetres.

As a preference, the path comprises a succession of loops offset from one another in the longitudinal direction of scanning.

As a preference, the focus of the beam is adjusted using precalculated focusing-parameter values calculated prior to the projecting of the beam of energy, each precalculated focusing-parameter value being associated with a position of the spot on the surface.

Equally, a second aspect of the invention proposes a device for the additive manufacturing of an object from a powder layer, the device comprising a source of energy configured for:

projecting a beam of energy onto a surface of the layer of powder in the form of a spot so as to melt the powder, commanding the scanning of the surface with the beam of energy so that the spot travels over the surface in a movement made up of a translation in a longitudinal direction of scanning and of a wobbling movement having at least a component in a direction of wobble, adjusting the focus of the beam of energy during the scanning according to the translation in the longitudinal direction of scanning but without taking account of the component of the wobbling movement in the direction of wobble.

BRIEF DESCRIPTION OF THE FIGURES

Further features, objects and advantages of the invention will become apparent from the following description, which is purely illustrative and non-limiting and which should be read in conjunction with the appended drawings, in which:

FIG. 3 is a flowchart of steps of an additive manufacturing method according to one embodiment.

FIG. 4 depicts a path followed by a spot resulting from the projecting of a beam of energy onto a surface during the implementation of the method to which FIG. 3 relates.

Across all the figures, the elements that are similar bear identical references.

DETAILED DESCRIPTION OF THE INVENTION

Additive Manufacturing Device

Figure 2:
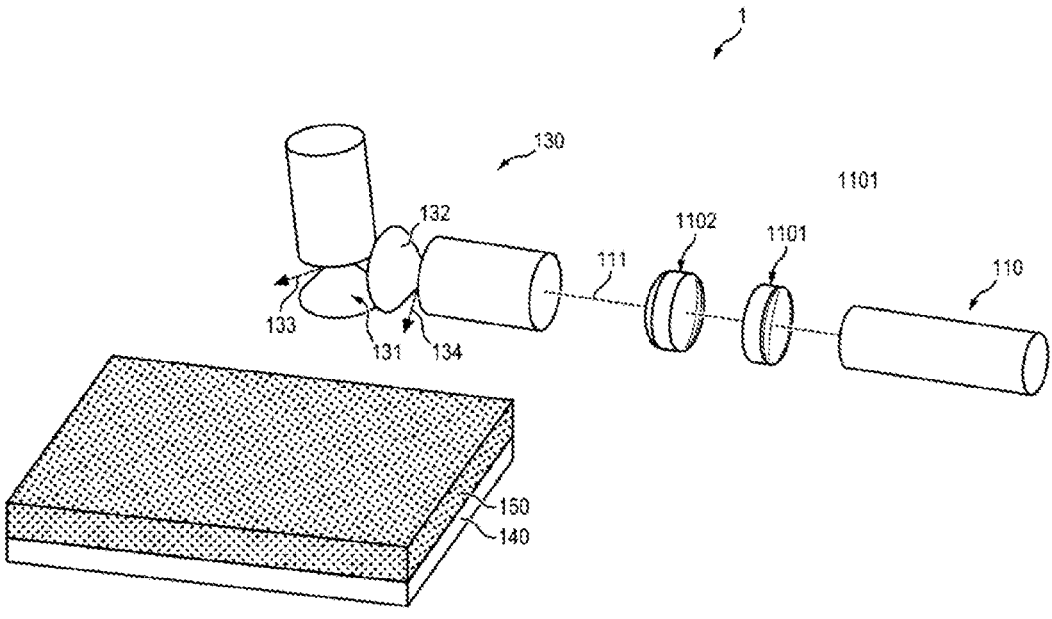
FIG. 2 is a schematic view of an additive manufacturing device according to one embodiment.

With reference to FIG. 2, an additive manufacturing device comprises an energy source 1 and a support 140.

The support 140 has a free surface, typically planar, extending in two directions: a longitudinal direction and a transverse direction perpendicular to the longitudinal direction. In what follows, the longitudinal direction will be denoted by convention as X, and the transverse direction as Y.

The free surface of the support 140 is intended to act as a support surface 140 for a layer 150 of powder or a plurality of layers 150s stacked on top of one another.

In general, the energy source 1 is designed to project a beam of energy towards the support 140. When a layer 150 of powder is deposited on the support 140, this beam of energy is projected onto an upper surface of this layer 150 in the form of a spot.

The energy source 1 notably comprises a generator 110 configured to generate the beam of energy. The generator 110 is, for example, a laser source; the beam generated then being a laser beam containing photons, or in other words a beam of light. As an alternative, the generator 110 is of the EBM (Electron Beam Melting) type designed to generate a beam of electrons. In what follows, it is the nonlimiting case of a laser beam that will be considered.

The energy source 1 further comprises a focusing apparatus designed to adjust the focus of the beam of light. This focusing apparatus is thus able to vary the size of the spot in the form of which the beam is projected onto the upper surface of a layer 150 of powder deposited on the support 140.

The focusing apparatus for example comprises a focusing element 1102 and a focusing lens 1101 able to move with respect to the focusing element in translation parallel to an optical axis of the lens. The focusing lens 1101 is positioned downstream of the beam generator 110. In what follows, the terms "upstream" and "downstream" implicitly refer to a direction of propagation of the beam of energy along an optical path extending from the generator 110 to the support 140.

The focusing apparatus comprises an actuator for moving the focusing lens 1101 with respect to the focusing element 1102.

The energy source 1 further comprises a scanning device 130 designed to orient the beam of energy such that the spot in the form of which this beam is projected is able to move relative to the support 140, over the surface of the layer 150, in the longitudinal direction and in the transverse direction.

The scanning device 130 is positioned downstream of the focusing device.

The scanning device 130 comprises for example a first scanning mirror 131 capable of rotational movement with respect to the support 140 about a first axis of rotation 133, and a second scanning mirror 132 capable of rotational movement with respect to the support 140 about a second axis of rotation 134 different from the first axis of rotation. One of the two scanning mirrors 131, 132 is positioned downstream of the other scanning mirror so that a beam of energy coming from the generator 110 is reflected off the two scanning mirrors in sequence before being directed on towards the support 140.

As a variant, the scanning device 130 comprises a single scanning mirror capable of rotational movement with respect to the support 140 about the first axis of rotation 133 and about the second axis of rotation 134. In that case, this single scanning mirror is positioned in such a way that a beam of energy coming from the generator 110 is reflected off this scanning mirror before being directed on towards the support 140.

The scanning device 130 moreover comprises at least one actuator (one per scanning mirror used). The purpose of each actuator is to move a scanning mirror rotationally about at least one axis of rotation and over a range of scanning angles.

The ranges of scanning angle are, for example, tailored to allow the spot to cover the entirety of the surface of the layer 150, or at the very least the majority thereof.

For a given configuration of the scanning device, the central axis of a beam emanating from the generator 110 intercepts the surface of the support 140 at a specific point.

There is thus a mathematical relationship between the coordinates (x, y) of this point and the angular position of the scanning mirrors 131, 132.

The scanning device 130 is in particular configured to elicit a composite movement of the spot projected onto the surface of the layer 150 of powder. This composite movement comprises a translation in a longitudinal direction of scanning, in an outbound sense and in a return sense that is the opposite of the outbound sense, these being in alternation with one another, the longitudinal direction of scanning being chosen independently of the longitudinal and transverse directions of the support 140.

The composite movement moreover comprises a wobbling movement of the spot in at least one direction of wobble, over the surface of a layer 150 of powder deposited on the support 140.

The laser source 110 and the scanning device 130 are, for example, arranged in such a way as to allow a rate of surface melting, which is to say the area of the layer 150 of powder covered by the laser spot per unit time, that is greater than 1000 cm2/min, for example greater than 2000 cm$^2$/min, for example greater than 4000 cm$^2$/min, for example less than 15000 cm$^2$/min, for example less than 10000 cm$^2$/min, for example of the order of 6000 cm$^2$/min.

The scanning device 130 is for example configured to allow the spot a rate of travel of between 0.5 and 10 m/s, for example between 1 and 5 m/s, for example equal to 1 or 2 m/s.

The energy source 1 moreover comprises a control unit configured to control the focusing apparatus and the scanning device 130 (the control unit is not illustrated). This control unit is particularly configured to control the respective actuators of these various devices.

The control unit may comprise or be coupled to a memory in which there is stored a table of precalculated focusing-parameter values calculated for various pairs of coordinates (x, y) in the plane of the free surface of the support 140. Thus, when the spot is centred on a point with coordinates (x, y) of the surface of the support, the control unit is configured to command the focusing apparatus using the focusing-parameter value which, in the table of pre-calculated values, is associated with this pair.

Additive Manufacturing Method

With reference to FIG. 3, an additive manufacturing method using the device described hereinabove comprises the following steps.

Figure 1:
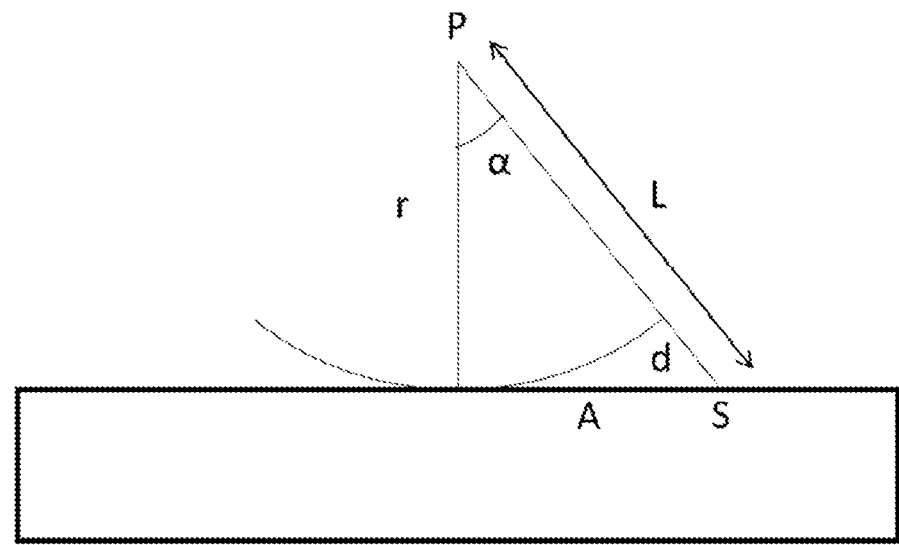
FIG. 1, already discussed, diagrammatically depicts the travel, in a transverse direction, of a wobbling beam of energy being projected onto a surface.

At least one layer 150 of powder is deposited on the support 140, as depicted in FIG. 1. The layer 150 of powder has a free surface extending in a longitudinal direction of the support and in a transverse direction of the support.

The grains of powder have for example a particle size of between 10 and 100 μm, for example between 20 and 60 μm, for example equal to 40 μm.

The material of the or each layer 150 of powder has, for example, a flowability of between 0.5 and 10 J/mm$^2$, for example of between 1 and 5 J/mm$^2$, for example equal to 2 J/mm$^2$.

The material of the or each layer 150 of powder may contain titanium and/or aluminium and/or Inconel and/or stainless steel and/or maraging steel. The material of the or each layer 150 of powder may consist of titanium and/or aluminium and/or Inconel and/or stainless steel and/or maraging steel.

The generator 110 is activated so as to emit a beam of energy. This beam of energy passes through the focusing apparatus and the scanning device 130 before being projected onto the free surface of the layer 150 of powder in the form of a spot (step 200). The layer 150 of powder therefore heats up in the region of this spot, to the point of eliciting melting of its particles.

The scanning device 130 orients the beam in such a way that the spot moves translationally in a longitudinal direction of scanning over the surface (step 202).

During step 202, the scanning device 130 causes the beam of energy to wobble so that this translation is modulated by a wobbling movement; the spot therefore moves with the composite movement mentioned hereinabove.

The wobbling movement may be embodied in a number of ways.

In a first embodiment, the wobbling movement is performed in a transverse direction of scanning only, this transverse direction of scanning being perpendicular to the longitudinal direction of scanning. The path followed by the spot is therefore a zigzag path.

In a second embodiment, the wobbling movement comprises a transverse wobbling component in a transverse direction of scanning and a longitudinal wobbling component in the longitudinal direction of scanning, the transverse direction of scanning being perpendicular to the longitudinal direction of scanning. In other words, this wobbling movement causes the spot to wobble on the surface of the layer 150 of powder not only in the transverse direction of scanning but also in the longitudinal direction of scanning.

The combination of these two components makes it possible to define a two-dimensional wobbling movement and thus define a spot path that comprises a succession of patterns offset from one another in the longitudinal direction of scanning, the shape of these patterns being dependent on certain parameters of these two components, notably their frequency, their amplitude and their phase shift.

For example, when the two components of wobbling oscillate at the same frequency, the wobbling movement may be circular or ellipsoidal. By combining this circular or ellipsoidal movement with the aforementioned translation performed by the scanning device 130, it is possible to contrive for the spot to follow, on the surface of the layer 150, a path that comprises a succession of loops that are offset from one another in the longitudinal direction as depicted in FIG. 4. In FIG. 4, the arrow in dotted line represents the aforesaid translational movement of the scanning device in the longitudinal direction.

The wobbling movement may, in a variant, have other shapes, for example that of a figure-eight or that of the infinity symbol (which is to say a figure-eight on its side). The spot then follows a path that comprises a succession of patterns that are more complex than simple loops.

When the wobbling movement has a transverse component, this transverse component preferably oscillates at a frequency of at least 1 kHz. This frequency is typically between 1 kHz and 10 kHz when the beam of energy is a laser beam, or between 1 kHz and 100 kHz when the beam of energy is an electron beam. Furthermore, the transverse component of the wobbling movement may oscillate at an amplitude of between 100 micrometres and 2 millimetres.

Similarly, when the wobbling movement has a longitudinal component, this longitudinal component preferably oscillates at a frequency of at least 1 kHz. This frequency is typically between 1 kHz and 10 kHz when the beam of energy is a laser beam, or between 1 kHz and 100 kHz when the beam of energy is an electron beam. Furthermore, the transverse component of the wobbling movement may oscillate at an amplitude of between 100 micrometres and 2 millimetres.

During the scanning, the focusing apparatus is called upon to adjust the focus of the beam of energy. In order to make such adjustments, the focusing lens 1101 is moved translationally relative to the focusing element 1102, and this has the effect of moving the image focal plane of the optical system formed by the source 1, with respect to the surface of the layer of powder 150.

The focusing adjustment performed by the focusing apparatus takes account of the scanning performed by the scanning device 130, which moves the spot translationally in the longitudinal direction. The fluctuations in spot size caused by the scanning are therefore limited by this adjustment.

More specifically, the beam focal length adjusted by the focus varies according to the angular position of the scanning mirrors of the scanning device.

As indicated previously, for a given configuration of the scanning device 130, the central axis of a beam of energy projected by the source 1 intercepts the surface of the support 140 at a specific point with coordinates (x, y). There is thus a mathematical relationship between the coordinates (x, y) of this point and the angular position of the scanning mirrors. By taking account of the mean thickness of the layer 150 deposited on the substrate, it is possible to calculate in advance the values of parameters used by the focusing apparatus in order to modify the focus of the beam during the course of the scanning, and store these in the memory used by the control unit. Thus, the control unit has no need to perform calculations in order to instruct the focusing apparatus.

By contrast, the focus adjustment performed by the focusing apparatus does not take account of the wobble generated by the scanning device 130. More specifically, the beam focal length is not dependent on the beam angular position caused by the wobble.

In other words, the focusing apparatus is configured to behave as if the wobbling of the beam were not present.

The foregoing steps are repeated over a plurality of adjacent zones of the surface in the transverse direction of scanning. These zones are scanned in the longitudinal direction of scanning, but in an outbound sense and a return sense that alternate with one another in order to accelerate the process of two-dimensional scanning of the surface of the layer of powder 150.

The method described above may be the subject of other variants.

Firstly, the beam of energy may be made to wobble by other types of wobble-inducing device than the device 120 described hereinabove, and may be focused by other types of focusing apparatus than the one described hereinabove. The foregoing method can be applied to any type of energy source capable of modifying the focus of a beam of energy being projected onto a surface in the form of a spot, and of moving this spot in a composite movement made up of a translation and of a wobble movement on this surface, whatever the internal structure of this source, and in particular the structure enabling the generation of the various components of this composite movement.

Secondly, in the method embodiment set out hereinabove, which is the preferred embodiment, no component of the wobbling movement is taken into account for adjusting the focus of the beam of energy. This offers the advantage of avoiding premature wearing of the source and particularly of the focusing apparatus. As a variant, when the wobbling movement has two components, one transverse and one longitudinal, it could be envisioned for the focusing of the beam to be dependent on only one of the two components of the wobbling movement. Admittedly, this causes greater source wear, but the control that the focus has over the beam is more precise.

Thirdly, even though precalculating focusing-parameter values is highly advantageous in order to avoid a heavy calculation burden, it is still possible for such values to be calculated on the fly during the course of the scanning.

The invention claimed is:

1. A method of additive manufacturing of an object from a layer of powder, the method comprising:

projecting a beam of energy onto a surface of the layer of powder in the form of a spot so as to melt the powder;

scanning the surface with the beam of energy so that the spot travels over the surface in a movement consisting of a translation in a longitudinal scanning direction and of a wobbling movement having at least one component in a wobbling direction; and adjusting a focus of the beam of energy during the scanning based on the translation in the longitudinal scanning direction but without taking account of the at least one component in the wobbling direction.

2. The method according to claim 1, wherein the wobbling movement comprises a transverse component in a transverse scanning direction perpendicular to the longitudinal scanning direction, and wherein the focus of the beam of energy is adjusted without taking account of the transverse component.

3. The method according to claim 2, wherein the transverse component of the wobbling movement oscillates at a frequency of at least 1 kHz.

4. The method according to claim 2, wherein the transverse component of the wobbling movement oscillates at an amplitude of between 100 micrometers and 2 millimeters.

5. The method according to claim 1, wherein the wobbling movement comprises a longitudinal component in the longitudinal scanning direction, and wherein the focus of the beam of energy is adjusted without taking account of the longitudinal component.

6. The method according to claim 5, wherein the wobbling movement comprises a transverse component in a transverse scanning direction perpendicular to the longitudinal scanning direction, and wherein the transverse component of the wobbling movement oscillates at a frequency of at least 1 kHz.

7. The method according to claim 5, wherein the longitudinal component of the wobbling movement oscillates at an amplitude of between 100 micrometers and 2 millimeters.

8. The method according to claim 1, wherein the spot travels a path comprising a succession of loops offset from one another in the longitudinal scanning direction.

9. The method according to claim 1, wherein the focus of the beam is adjusted using precalculated focusing parameter values calculated prior to the projecting of the beam of energy, each precalculated focusing parameter value being associated with a position of the spot on the surface.

10. A device for additive manufacturing of an object from a layer of powder, the device comprising an energy source configured to project a beam of energy onto a surface of the layer of powder in the form of a spot so as to melt the powder, the energy source comprising a control unit configured to:

cause the beam of energy to scan the surface so that the spot travels over the surface in a movement consisting of a translation in a longitudinal scanning direction and of a wobbling movement having at least one component in a wobbling direction; and adjust a focus of the beam of energy during the scanning based on the translation in the longitudinal scanning direction but without taking account of the at least one component in the wobbling direction.

* * * * *